Jan. 15, 1924. 1,480,621
A. J. LEE
TRANSMISSION MECHANISM FOR LOOMS
Filed June 21, 1922 2 Sheets-Sheet 1

Inventor
Andrew J. Lee

Jan. 15, 1924. 1,480,621
A. J. LEE
TRANSMISSION MECHANISM FOR LOOMS
Filed June 21 1922  2 Sheets-Sheet 2

Inventor
Andrew J. Lee

Attorney

Patented Jan. 15, 1924.

1,480,621

UNITED STATES PATENT OFFICE.

ANDREW J. LEE, OF INMAN, SOUTH CAROLINA.

TRANSMISSION MECHANISM FOR LOOMS.

Application filed June 21, 1922. Serial No. 569,844.

*To all whom it may concern:*

Be it known that I, ANDREW J. LEE, a citizen of United States, residing at Inman, in the county of Spartanburg, State of South Carolina, have invented certain new and useful Improvements in Transmission Mechanism for Looms; and I do hereby declare the following to be a full, clear, and exact description of the invention, such as will enable others skilled in the art to which it appertains to make and use the same.

The object of the invention is to provide a transmission mechanism for use in connection with looms particularly of the conventional and well known types whereby motion is communicated from the drive or crank shaft to the cam shaft which ordinarily carries the cams or equivalent means whereby motion in timed relation is conveyed to the picker stick, the harness mechanism, the stop motion and the like, and wherein adjustment under ordinary conditions is necessary from time to time to take up lost motion incident to wear particularly in the elements of the gearing representing the transmission mechanism in order to prevent hammering and shock and consequent excessive straining and frequently breakage of the parts; and more particularly to provide a transmission mechanism wherein the adjustment necessary to maintain a proper timed relation in the operation of the parts and to compensate for wear which is unavoidable in machines of this type may be accomplished in the elements of the gearing to avoid the necessity of modifying the positions or relations of the elements which are carried respectively by the driving and cam shafts; and further-more to provide a transmission mechanism having an increased durability and usefulness as compared with devices for a similar purpose heretofore employed, with a view to economy in construction and maintenance and to the end that the break down of the machine, incident, for example, to the fracture of the crank shaft due to lost motion in the propulsion of the shuttle may be avoided; and with these and related objects in view, the invention consists in a construction, combination and arrangement of parts of which a preferred embodiment is shown in the accompanying drawings, wherein;

Figure 1:
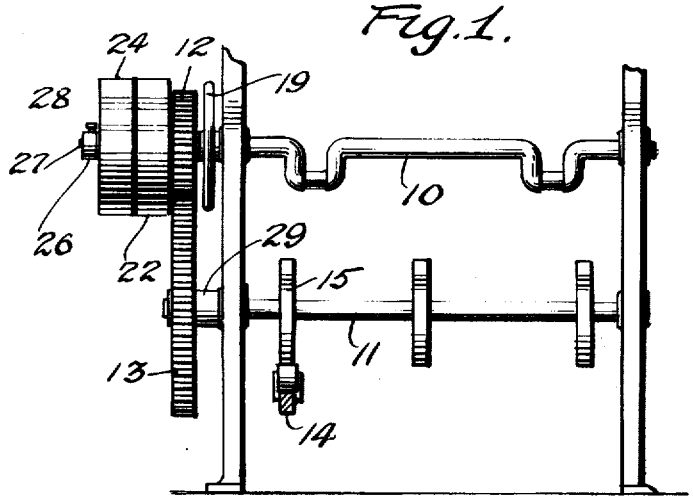
Figure 1 is an end view in outline of a loom equipped with a transmission mechanism constructed in accordance with the invention.
Figure 2:
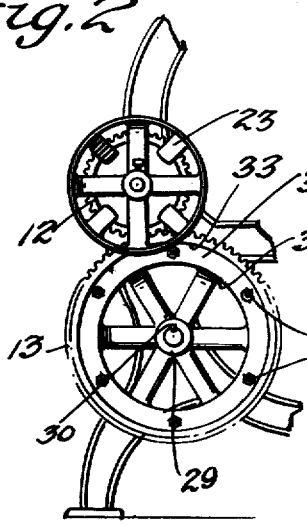
Figure 2 is a front view of the same.
Figure 3:
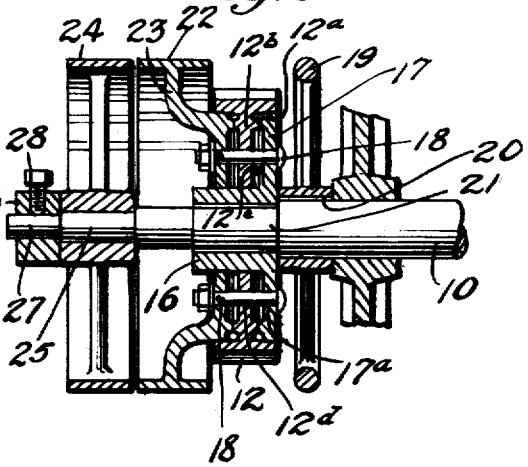
Figure 3 is a sectional view of the upper or crank shaft carried elements of the mechanism taken in the plane of the axis of the cam shaft.
Figure 4:
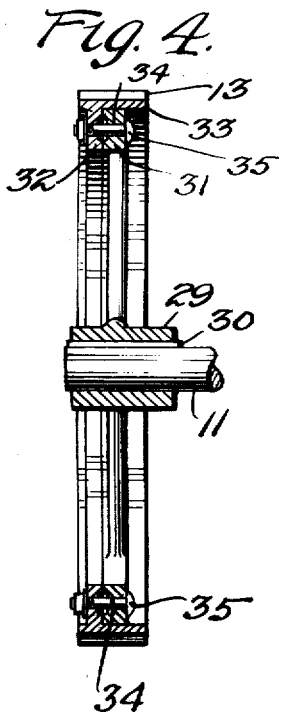
Figure 4 is a similar view of the lower or cam shaft carried elements of the mechanism.
Figure 5:
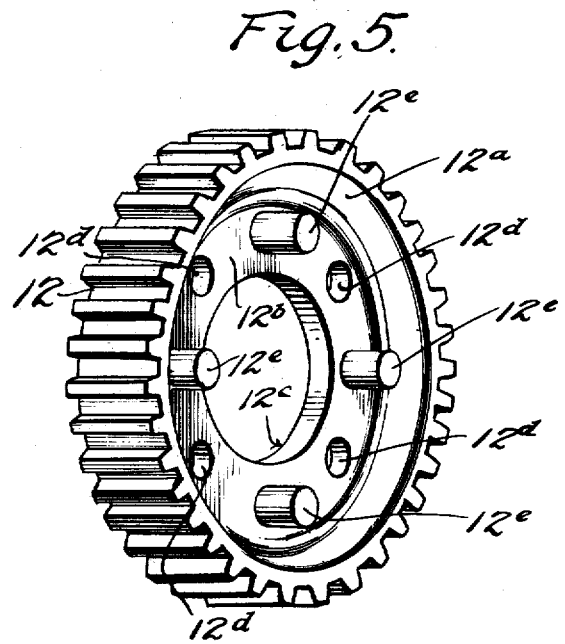
Figure 5 is a detail view of the crank shaft gear member.
Figure 6:
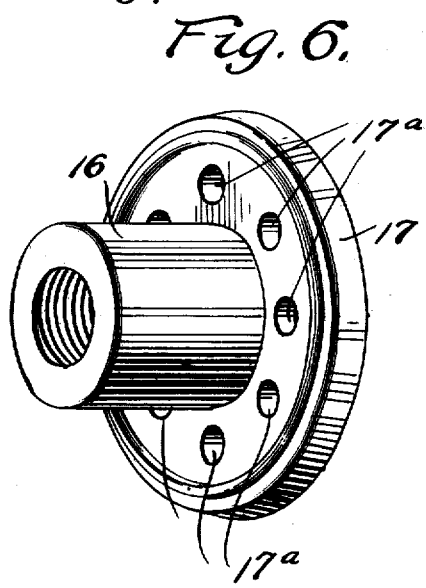
Figure 6 is a similar view of the hub of the crank shaft gear member.
Figure 7:
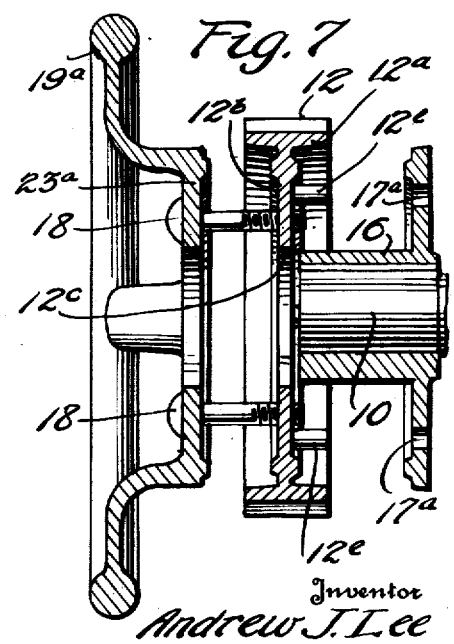

Figure 7 is a sectional view with the parts separated of an arrangement of the crank shaft carried elements wherein the hand wheel is attached to the outer side of the gear as when the drive pulley, in accordance with the construction of relatively old types of looms, is arranged at the opposite or rear end of the crank shaft, as distinguished from the later types wherein it is preferred to place the pulley at the front end of the shaft to minimize the vibration and torsional strain applied to the crank shaft.

As in the ordinary practice the transmission mechanism whereby motion is communicated from the crank shaft 10 to the cam shaft 11, consists essentially of the intermeshing gears 12 and 13 respectively carried by said shafts with the latter having a number of teeth which is a multiple of those of the former and in the present instance, as ordinarily, is twice that of the former, so that the crank shaft gear rotates twice for each revolution of the cam shaft gear. In the ordinary practice and under the conditions obtaining in the operation of devices of this type there are usually four teeth of each gear in meshing or in engaging relation when the principal strain comes on the said gears incident to the actuation of the picker stick 14 in its shuttle propelling movement by the cam 15, which as above indicated is carried by the cam shaft, and obviously when the crank shaft gear rotates twice for each revolution of the cam shaft gear, and the latter is subjected to the shuttle operating strain once during each revolution, the same four teeth of the crank shaft gear will be subjected to the strain due to the shuttle operation repeatedly during the operation of the machine, with the result as is well known to loom operatives that the engaged teeth are subjected to a wear which is disproportionate to the other parts of the gear and within a comparatively short time are reduced to such an extent as to permit of lost motion which involves a jar or shock, causing an objectionable straining of the mechanism and frequently a breakage of the crank shaft, or a breakage of the reduced teeth and therefore the destruction of the damaged gear so far as further utility is concerned. The worn teeth are therefore unsuitable for use at the moment for communicating shuttle motion to the picker stick but are not worn to an extent rendering them useless in communicating motion from one gear to the other; as, when not subjected to the strain incident to the propulsion of the shuttle these worn teeth are suitable for maintaining a continuous communication of motion from one gear to the other.

It therefore becomes desirable to provide means whereby the parts of the mechanism may be adjusted from time to time to bring different sets of gear teeth into meshing relation at the moment of communicating shuttle propelling motion to the picker stick, and various means have been employed heretofore for this purpose including the adjustment of the cams and the adjustment of the gears. The adjustment of the cams is objectionable for the reasons that they are subject to slipping or disarrangement after having been placed in the adjusted positions, with the result that serious injury to the loom may be incurred, and the adjustment of the gears as heretofore suggested is objectionable by reason of the fact that the means for keying them to the shafts are difficult to remove and frequently cannot be removed without involving the fracture of the gears. In this connection it has also been proposed to provide for an adjustment of the rim portion of the crank shaft carried gear with respect to the shaft, but only under conditions providing for the utilization of a comparatively small number of the teeth of the gear, and under conditions necessitating a special construction of gear as distinguished from the stock forms commonly used in this connection and adapted by slight modification to perform all of the requisite functions.

In the present construction the crank shaft carried gear 12 is of the ordinary conventional or stock form having the rim 12ª which carries the gear teeth, and a web 12ᵇ which is provided with a central opening 12ᶜ, to the end that a gear made in accordance with the usual practice may be utilized in this connection, by reason of the fact that there is associated therewith a hub member 16 also provided with a web member 17 corresponding in area substantially with the web member of the gear and adapted to overlap and lie in contact with said web member of the gear with its periphery in contact with the inner surface of the gear rim, so that the hub web is housed within the space bounded by the gear rim. Assuming then that the gear 12 which is carried by the crank shaft is provided with thirty-two teeth, and that four of these teeth as in the ordinary practice are simultaneously engaged with a corresponding number of teeth of the gear 13 at the moment of greatest strain in the operation of the loom, it is proposed to divide the total number of teeth of the gear by four and to provide for a series of adjustments of the gear rim which corresponds with the dividend of the total number of gear teeth, thirty-two, divided by four which represents the number of teeth engaged at one time, or in other words to provide for eight adjustments of the toothed rim with relation to the hub member of the gear, to the end that the hub member may be permanently attached to the crank shaft and allowed to remain in a fixed relation thereto while permitting of the adjustment of the rim member from time to time to bring all of the teeth thereof into position for effective operation so that all of the teeth of the drive gear may be utilized successively and the complete efficiency of the gear utilized before discarding the rim to give place to a new rim member.

To this end the hub web is provided with a series of eight transverse openings 17ª for respective and successive registration with a corresponding number of stations in the web 12ᵇ of the gear, but in practice it is preferred to provide the gear web with alternately arranged openings 12ᵈ and key studs 12ᵉ, so that the conventional four bolts 18 fitted with suitable heads and nuts may be engaged with the registering openings in the rim and hub webs while the intermediate openings of the hub web are engaged by the key studs which, being formed integrally with the web of the rim member, have a strength and rigidity which can be utilized to an advantage in the event that one or more of the bolts should become loosened or disengaged, and which serve to effect such an interlocking relation between the gear hub and rim as to afford the stability of a solid gear.

The hub member may be keyed as in the ordinary practice to the cam shaft but it is preferred in some instances, as illustrated in the drawing, to secure the same by threading, either the right hand or left hand according to the direction of rotation of the shaft, and mounted upon the shaft adjacent to the inner surface of the gear there may be a hand wheel 19 which is shown as secured by means of a key 20, the shaft being shouldered as indicated at 21 at the inner end of the threaded portion so that strain on the gear serves to force it inwardly against the shoulder and thereby effect a substantial engagement while permitting of the removal of the gear hub with facility when required.

In the older types of looms it was the practice to arrange the transmission gearing at the front end of the crank shaft and to communicate motion to the shaft by means of a drive pulley or its equivalent located at the rear end thereof with the incident disadvantage that a considerable vibration of the crank shaft results, and in the event of severe strains, as by there being lost motion in the transmission mechanism, the breakage of the crank shaft adjacent to one of the cranks frequently resulted, and therefore in the later types of looms it is preferred to locate the drive pulley at the front of the crank shaft adjacent to the plane of the transmission gearing, and the construction herein disclosed is designed to permit of this arrangement by the extension of the hub member 16 beyond the outer face of the rim web, so that the drive pulley 22 may be provided with a web 23 having an opening of a diameter sufficient to receive the hub, to the web of which it may be secured by the same bolts which serve to secure the webs of the hub and rim of the gear in their proper relations, the drive pulley thus being arranged outside or in front of the gear with the loose pulley 24 revolubly mounted upon a slightly reduced portion 25 of the crank shaft outside of the fast pulley. The loose pulley may be secured in place by means of a collar 26 fitted on a still further reduced portion 27 of the crank shaft and locked by means of a set screw 28 or any equivalent thereof. As shown the web of the drive pulley is lightened by having cutaway portions. In order to provide for an angular step by step adjustment by the rim member of the gear it is only necessary to displace the loose pulley and remove the nuts from the bolts in order to permit of the dismounting of the drive pulley to give access to the rim member of the gear.

The driven or cam shaft carried gear 13 which as above indicated carries a number of teeth which is a multiple of the number with which the drive gear is provided, consists of a hub member 29 also adapted to be secured to the cam shaft by a key 30 or any equivalent means so as to provide for rigidity and insure permanence, said hub member being provided with a web 31 for arrangement in overlapping relation with a corresponding web 32 of the rim or tooth carrying member 33, said web of the hub member preferably being spoked or cut away for reducing the weight. The hub web as described in connection with the drive gear bears peripherally against the inner surface of the rim, but the web of the rim preferably overlaps that of the hub only adjacent to its outer edge a sufficient distance to afford a substantial provision for the bolt openings 34 of which a plurality may be provided, as indicated, for the reception of the transverse bolts 35 which permit of a progressive step by step adjustment of the rim member to bring different zones of its toothed periphery into engaging relation with the teeth of the drive gear at the moment of stress on the cam shaft particularly incident to the actuation of the picker stick. This adjustment permits of elimination of lost motion in the communication of movement to the cam shaft without necessitating the adjustment of the cams with relation to the shaft and hence without incurring the disadvantage heretofore experienced of involving the slipping of the cams on the shaft, so that the cams may be rigidly keyed to the shaft to guard against any relative displacement thereof.

In the modified arrangement illustrated in Figure 7 of the drawings and which is designed particularly for use in connection with those looms wherein motion is communicated to the crank or drive shaft through a pulley or its equivalent located at the rear end of the shaft, as distinguished from the front end or near the transmission gearing as preferred in the more recent forms of looms, the hand wheel 19ᵃ may be provided with a web 23ᵃ similar to that shown in connection with the wheel 22 of the preferred form for attachment by means of the bolts 18 to the web of the drive gear, so that when it is necessary to adjust the latter angularly to bring fresh teeth thereof into operative position at the moments of the maximum strains applied to the mechanism, it is only necessary to loosen the bolts sufficient to remove the hand wheel in order to release the rim member of the gear as described more particularly in connection with the preferred form.

What is claimed is.

1. In transmission mechanism for looms, the combination with a gear having an internal web positioned intermediate its side edges, the said web being formed with transverse openings and transversely projecting lugs, of a hub member provided with a web formed with a series of transverse openings to receive the said lugs, the said web of the hub being housed within a space bounded by one edge portion of the gear rim, and a drive pulley carried by the hub at the other side of the said gear.

2. In transmission mechanism for looms, the combination with a gear having an internal web positioned intermediate its side edges, the said web being provided with transverse openings and transversely projecting lugs, of a hub member provided with a web formed with a series of transverse openings to receive the said lugs, a drive pulley having a web formed with an opening to receive the said hub, the said gear rim overlapping the said webs of the hub and drive pulley and contacting therewith.

In testimony whereof, I affix my signature, in the presence of a witness.

ANDREW J. LEF

Witness:
GILBERT S. GATLEY